Feb. 24, 1942.  W. E. PAULSEN  2,273,888
OIL PRIMER
Filed Feb. 27, 1937    5 Sheets-Sheet 1

Inventor:
Waldemar E. Paulsen

By:

Attys.

Feb. 24, 1942. W. E. PAULSEN 2,273,888

OIL PRIMER

Filed Feb. 27, 1937 5 Sheets-Sheet 5

Inventor:
Waldemar E. Paulsen
By: Brown Jackson Boucher Dennis
Attys.

Patented Feb. 24, 1942

2,273,888

UNITED STATES PATENT OFFICE 2,273,888

OIL PRIMER

Waldemar E. Paulsen, Maywood, Ill.

Application February 27, 1937, Serial No. 128,105

32 Claims. (Cl. 123—196)

The present invention relates generally to lubrication systems, and more particularly to lubrication systems for automobile engines.

The principal object of the present invention is the provision of means for storing lubricant under pressure, and mechanism for delivering the lubricant to the engine before the engine begins to run, preferably before the engine is actually cranked in the operation of starting the engine.

Heretofore, attempts have been made to inject lubricant into the lubrication system of an internal combustion engine, but usually such injection has occurred concomitantly with the operation of cranking the engine, rather than prior to such operation. For example, it has been known to controllably direct a flow of lubricant to the bearings of the engine by mechanism that is operated when the starting mechanism of the engine is placed in operation. As is obvious, while such initial lubrication of the engine bearings may have some advantage, where the injection does not occur until the starter pedal or button is pressed the lubricant does not have time to reach the bearing surfaces before the latter begin to have relative movement.

An important object of the present invention is the provision of means that not only adequately lubricates these parts a length of time, preferably under the control of the operator, before the parts are called upon to move, either by the cranking operation or by the initial running of the engine, but also primes the lubricant pump before any part of the engine begins to move, so that when relative motion does occur, either in the cranking or the initial running of the motor, an adequate supply of lubricant is immediately directed through the bearings of the engine.

According to the principles of the present invention, one manner of attaining this objective is to store lubricant under pressure, preferably but not necessarily from the lubrication system of the engine itself, and directing a flow of lubricant to prime the lubricant pump and to secure initial lubrication by means that is energized just as soon as the ignition switch of the electrical system of the engine is closed, which, even in automatic starting units, occurs an appreciable time before the actual cranking of the engine is effected. Thus, I am enabled to secure full lubrication of the engine for a length of time before any parts of the engine begin to move. In manually controlled starting mechanisms, the operator can turn on the ignition switch, which initiates the auxiliary lubrication above referred to, and has thus full control of the length of time between the initiation of the auxiliary lubrication and the initiation of the engine starting mechanism.

In this connection, it is a further object of the present invention to provide a source of lubricant under pressure and an electrical control therefor so connected with the ignition switch and other parts of the electrical system of the automobile that as soon as the engine begins to run, the auxiliary lubrication is terminated and the conventional lubrication of the engine resumed.

An additional object of the present invention is the provision of controlling means—for example, for a source of lubricant under pressure—that is so connected with the ignition system of the engine that as soon as the latter begins to run the generator develops sufficient voltage to terminate the initial flow of current through the controlling unit, thereby terminating the controlling function of the latter so far as directing lubricant to the pump and bearings is concerned. A further object of the present invention is the provision of means terminating the auxiliary lubrication operation in accordance with the development of suction in the intake manifold of the engine, whereby the auxiliary lubrication unit is made responsive to the running of the engine in accordance with the development of suction as an incident to the operation of the engine. A further object of the present invention is to incorporate in the auxiliary lubrication unit a controlling solenoid arrangement, the current through which is controlled either by the generator voltage or by the development of suction, as aforesaid.

Another important object of my invention is the provision of a combined lubricant filter and storage tank which not only serves the purpose of storing lubricant under pressure to make the same available for auxiliary lubrication according to the above principles, but also in the same physical embodiment includes means for filtering the lubricant. A combined unit of this type has the advantage that with only a few additional parts, the advantages of both a filtering unit and an auxiliary lubrication unit are realized. In this connection, it is a further object of the present invention to provide valve mechanism controlling the pressure at which lubricant is stored in the filter, which valve means also serves the purpose of determining the pressure at which lubricant normally is circulated through the engine during the normal operation of the latter and its conventional lubricating system. More specifically, it is an object of the present invention to provide biased valve mechanism which effectively and positively maintains the desired pressure within the filter without chattering and without danger of any leakage that would tend to destroy the utility of the filter as a lubricant storage chamber.

A further object of the present invention is the provision of a unit for priming the oil pump and for supplying lubricant under pressure to the bearings prior to the operation of the engine, and to so connect the unit into the lubrication system that air from the latter, originating in the draining and refilling of the system when the engine is stopped and started a number of times, can be utilized for maintaining an air cushion in the auxiliary priming and lubricating unit so as to maintain the desired pressure therein at all times.

These and other objects and advantages of the present invention will be apparent to those skilled in the art after a consideration of the following detailed description of the preferred structural embodiments, taken in conjunction with the accompanying drawings illustrating the same.

Figure 1:
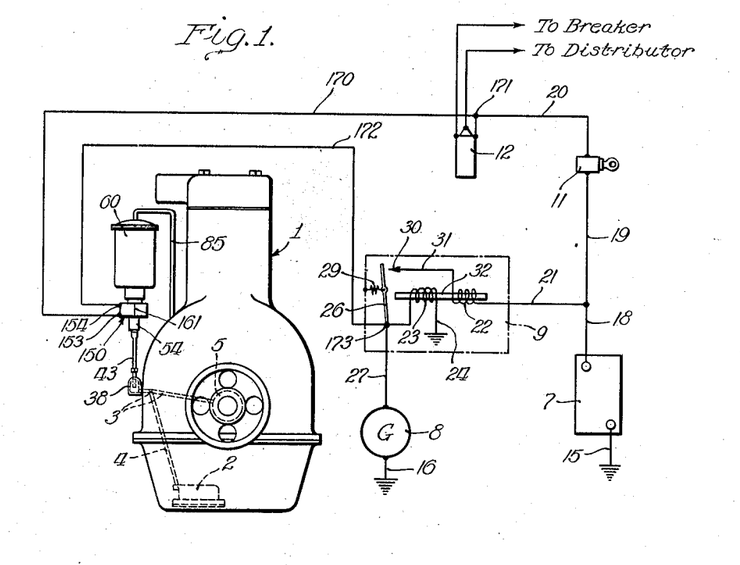
Figure 1 is an end view of an automobile engine equipped with a unit embodying the principles of the present invention, some of the parts of the electrical system for the engine being indicated diagrammatically.
Figures 2, 3:
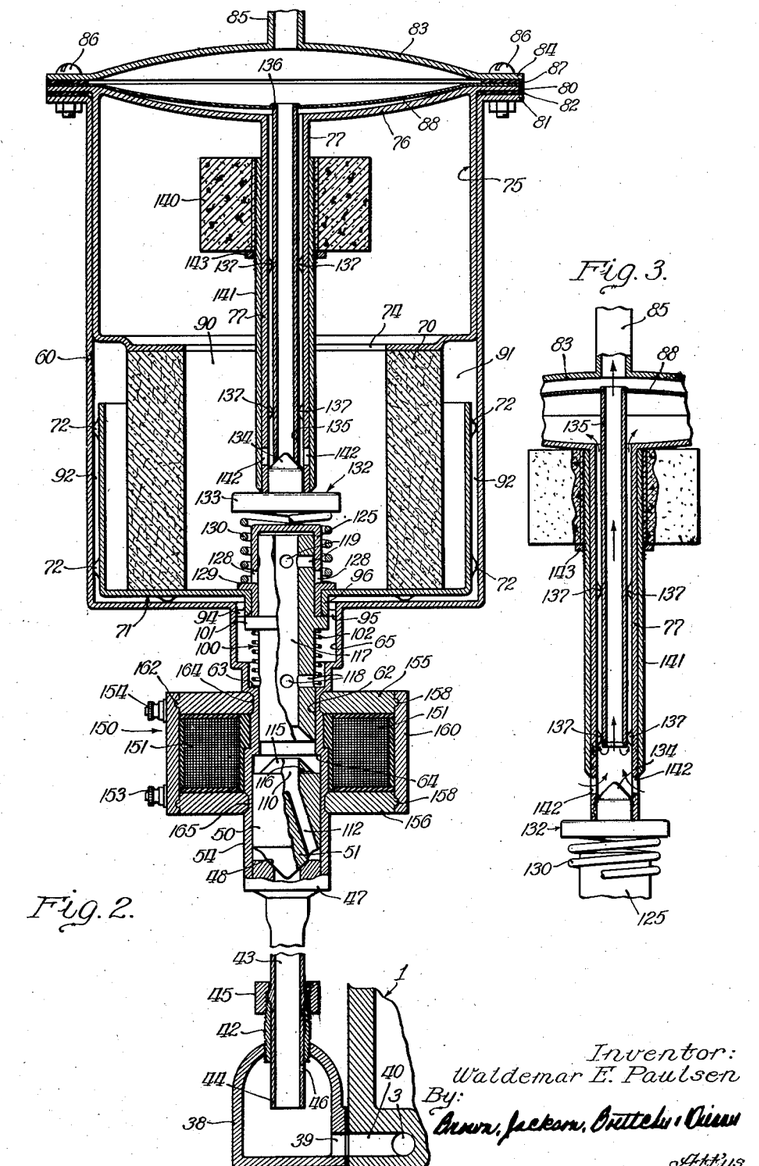
Figure 2 is a vertical section taken through the combined filter and oil priming and lubricating device shown in Figure 1, with the parts shown in the position they occupy when the engine is not running and lubricant is stored under pressure.
Figure 3 is a fragmentary section, similar to Figure 2, showing portions of the device when lubricant is being directed into the filter chamber at a pressure such that the relief valve mechanism opens to permit the excess lubricant to flow back to the crank case of the engine.

Referring now to the drawings, and particularly to Figures 1 and 2, the reference numeral 1 indicates a conventional internal combustion engine of the type used in automobiles and the like, and which is provided with a lubrication system that includes an oil pump 2, lubricant passages 3 receiving lubricant from the pump 2 through an oil pipe 4, and directing the same to various bearings, such as the main bearings 5 of the engine 1. The engine 1 is also provided with an electrical system that includes a storage battery 7, a generator 8 having incorporated therein a cutout 9, shown on an enlarged scale compared to the generator in Figure 1 for purposes of clarity, and an ignition system that includes an ignition switch 11 and a coil 12. The battery is grounded through a conductor 15, and the generator 8 is grounded through a conductor 16. Conductors 18 and 19 connect the switch 11 to the ungrounded side of the battery, and the conductor 20 leads from the switch 11 to the coil 12. Another conductor 21 leads from the battery conductor 18 to the current coil 22 of the cutout 9. The potential coil 23 of the cutout 9 is grounded, as at 24, and is connected at one end to a switch 26 and through a conductor 27 to the ungrounded side of the generator 8. The switch 26 is biased toward open position by a spring 29 but is adapted to be closed against a contact 30 that is connected through a lead 31 with the end of the battery coil 22 opposite the end thereof that is connected through leads 21 and 18 to the battery 7. A cutout of this type is well known, and the structure shown in Figure 1 in this connection is intended to be representative of the usual devices of this general character. The coils 22 and 23 are so wound that the flow of current from the generator 8 to ground through the coil 23 causes the switch 26 to be closed, and then current flows from the generator 8 through the switch 26 and the connector 31 to the coil 22, and through the leads 21 and 18 to the battery, thereby charging the same, as is well known. However, when the generator voltage drops and the battery 7 starts to discharge through the switch 26 and generator, the reverse flow of current through the coil 22 so reduces the pull of the core 32, around which the coils 22 and 23 are disposed, that the spring 29 pulls the switch 26 open, thereby preventing any further discharge of the battery 7. As mentioned above, this is conventional practice.

The ignition system of the engine 1 includes the above described switch 11 and coil 12, and is so arranged that when the switch 11 is closed, current flows from the battery 7 through the conductors 18 and 19, the switch 11, and the conductor 20, through the coil 12, and from the latter the current flows to the circuit breaker and the distributor in the usual manner.

Referring now to Figure 2, a fitting 38 is fastened to the side of the engine 1 and communicates with the lubricant duct 3 through an opening 39 and a bore 40 formed in the crank case of the engine 1. The upper end of the fitting 38 is in the form of a dome having a threaded opening therein to receive a threaded sleeve 42 through which the lower end of a tube 43 extends, as at 44, for a purpose which will be referred to later. The tube 43 is detachably connected in any suitable manner, as by a threaded collar 45. The lower end of the tube 43 has a small hole 46 opening into the upper portion of the fitting 38. The tube or conduit 43 extends upwardly and is provided with an enlarged end 47 having an upwardly facing valve seat 48, which is of non-magnetic material, with which a plunger 50 carrying a conical valve section 51 is adapted to cooperate in serving as a check valve for closing the upper end of the tube or pipe 43.

The plunger 50, which is formed of magnetic material, is movably mounted within the lower end of a sleeve or tubular member 54 which is formed of brass or other non-magnetic material and which communicates with the lower end of a filter casing 60. Preferably, the filter casing 60 and the depending tubular member or sleeve 54 are formed integrally, but they may be formed separately and welded or otherwise fixedly and permanently connected together in leak tight relation. The tubular member 54 is provided with a portion 62 of reduced diameter, forming upper and lower shoulders 63 and 64, and the member 54 where it connects to the bottom of the filter casing 60 is provided with an enlarged section 65 serving as a chamber in direct communication with the bottom of the filter casing 60.

Mounted within the casing 60 is a cylindrical filter element 70, illustrated for purposes of convenience as a cylindrical member seated in a supporting cup 71 that has its walls spaced from the interior of the walls of the casing 60 by small protuberances 72 or the like, and the upper end of the filter member 70 receives the inwardly directed flange 74 of a hollow member 75 that is disposed in the upper part of the casing 60 and has an integral upper wall 76 from the center of which a tubular section 77 extends downwardly to a point adjacent the lower end of the casing 60. Preferably, the central tube 77 and the upper end 76 are formed integrally with the other portions of the member 75 so that there will be no likelihood of loss of pressure due to leakage of either air or lubricant. The member 75 is provided with a radially outwardly disposed flange 80 that cooperates with a flange 81 formed on the upper end of the filter casing 60. A gasket 82 is placed between the flanges 80 and 81 to provide a leak tight connection at this point, and a domed cover 83 has a flange 84 and a lubricant return conduit 85, and is fastened to the flanges 80 and 81 by suitable means, such as bolts 86. A gasket 87 is disposed between the cover 83 and diaphragm 88 of valve mechanism that will be described below, so that when all of the bolts 86 are tightened, the parts of the filter housing are fastened together in leak tight relation.

The filter casing 60 communicates with the lubrication system, represented in Figure 2 by the duct 3, through the tubular member 54 and tube 43, and the filter element 70 and associated members 71 and 75 divide the casing 60 into what is termed a filtered lubricant chamber 90 and an unfiltered lubricant chamber 91. The cup member 71 with its protuberances 72 define a passage 92 which, at its lower end, communicates with the chamber 65 at the lower end of the casing 60 through notches 94 cut in the flange 95 carried by the central neck portion 96 of the cup member 71 which is formed of non-magnetic material. The ends of the flange extensions between the notches 94 are accurately formed to fit closely within the upper end of the chamber 65 so as to hold the cup member 71 in accurate coaxial relation with respect to the axis of the tubular member 54 in which the chamber 65 is formed. These parts support the valve mechanism that is referred to below so that accuracy of alignment is secured. At the same time, the notches 94 allow for a flow of lubricant up through the tubular member 54 and along the outer walls of the cup member 71 into the unfiltered lubricant chamber 91.

A valve plunger 100 is mounted for axial movement within the tubular member 54 above the check valve plunger 50, and is provided with a radially outwardly extending shoulder 101 that receives the upper end 102 of a light spring, the lower end of which is seated against the shoulder 63. The spring is capable of exerting sufficient force to overcome the weight of the valve plunger 100 and to hold the same in an upper position with its flange 101 against the lower notched portion 95 of the neck 96, as indicated in Figure 2. The diameter of the plunger 100, both above and below the flange 101, is substantially the same as the internal diameter of the portion 62 of the tubular member 54 which forms a part of the filter casing 60, and the plunger 100 is mounted for sliding movement in the portion 62 with a fairly close fit.

Figure 4:
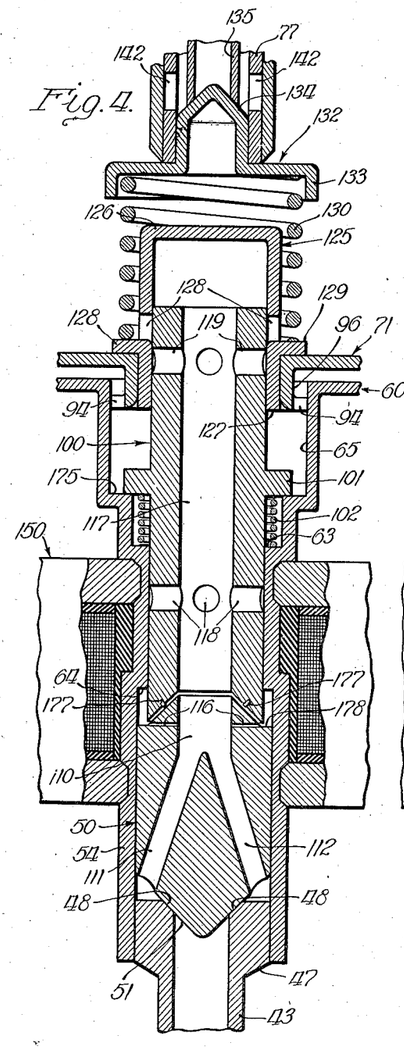
Figure 4 is an enlarged view of the controlling valve mechanism with the parts arranged in the position they take when the solenoid has first been energized but before the check valve has been opened.

As best shown in Figure 4, the check valve plunger 50 is provided with a central duct or bore 110 leading downwardly into two or more branches 111 and 112, which terminate on opposite sides of the valve section 51. The upper end of the check valve plunger 50 is of generally frusto-conical formation as indicated at 115 in Figure 2, and has several horizontal vents 116 which will be referred to later. The lower end of the valve plunger 100 has a tapered end of complementary formation with respect to the upper end of the member 50. The member 100 also has a central bore or duct 117 which is in coaxial alignment with the check valve bore 110 and which extends from one end to the other of the plunger 100. Transverse ducts 118 are formed substantially midway between the lower end of the plunger 100 and the radial flange 101, and another set of transverse bores 119 are formed near the upper end of the plunger 100. These transverse bores lead from the central duct or bore 117 radially outwardly, and when the plunger 100 is held in its upper position (Figure 2) the transverse bores 118 are disposed above the shoulder 63 so that communication is established between the interior duct 117 and the chamber 65 which leads to the unfiltered lubricant chamber 91.

The upper end of the valve plunger 100, and especially the portion carrying the upper transverse bores 119, is disposed within a non-magnetic cap or sleeve member 125 which is closed at its upper end, as at 126, and has a lower portion 127 fitting closely and concentrically within the neck section 96 of the cup member 71, and in between the upper and lower ends the sleeve member 125 is provided with a number of ports 128, preferably but not necessarily formed by punching out tabs or projections 129 which serve to limit the downward movement of the sleeve member 125 under the influence of a spring 130, the lower end of which is seated on the tabs or flanges 129 and the upper end of which is seated in the lower end of a valve member 132, the latter being flanged as at 133 to form a seat for the upper end of the spring 130. The valve member 132 includes a conical valve closure 134 that is slidably mounted with a fairly close fit in the lower end of the tube 77 that depends integrally from the cap or top portion 76 of the filter housing member 75. The conical portion 134 of the valve member 132 also cooperates with the lower end of a tube 135 (Figure 2) which extends downwardly through the tube 77 and is welded, as at 136, or otherwise firmly and rigidly fastened to the diaphragm 88. The tube 135 is guided for vertical movement by protuberances 137. The operation of this valve mechanism will be described below. The spring 130 normally serves to hold the member 132 up in the position shown in Figures 2 and 4, and the spring 130 also serves to hold the member 125 down in the position shown in these figures. Either member 125 or 132 may move against the action of the spring 130, as will be described below. In the position of the valve plunger 100 in which the latter is held with its flange 101 up against the notched flange 95 on the neck 96 of the cup member 71, the transverse bores 119 at the upper end of the valve plunger 100 are disposed above the ports 128, the latter communicating with the filtered lubricant chamber 90, as will be clear from Figures 2 and 4.

A float 140 is disposed within the upper portion of the filtered lubricant chamber, as best shown in Figure 2, and may be of any suitable construction, such as a hollow metal body or a ring of cork or other material mounted on a bushing having a threaded connection with the upper end of a vertically slidable sleeve 141, the lower end of the latter in the lower position of the float 140 serving to cover ports 142 formed in the lower end of the fixed tube 77. A lock nut 143 or other suitable means serves to fix the float in adjusted position on the valve tube 141.

Both of the valve plungers 50 and 100 are formed of magnetic material, and as mentioned above, they are mounted for axial movement within a sleeve or tubular extension 54 formed of non-magnetic material. These valves and associated parts are preferably under the control of an electromagnet of the ironclad type. The electromagnet is best indicated in Figure 2 by the reference numeral 150, and comprises a coil 151 surrounding the non-magnetic tubular member 54, within which the plungers 50 and 100 are slidable, there being suitable terminals 153 and 154 by which the coil 151 may be connected into the electrical system of the motor in the manner shown in Figures 1 and 12. The electromagnet 150 includes end pieces 155 and 156, each of which is preferably formed of two halves to facilitate assembly about the member 54, and each half of each of the end pieces 155 and 156 is formed with a bead 158. A spring ring 160, split as at 161 (Figure 1), is provided with grooves 162 formed on the inner surface thereof, and the purpose of having the member 160 in the form of a split ring is to permit the member 160 to be expanded sufficiently to receive the ends 155 and 156 and to be sprung over the beads 158 thereof until the latter lie in the grooves 162, whereupon the entire electromagnetic assembly is held in proper position. The tubular member 54 is provided with shallow grooves 164 and 165 to receive the radially inner sections of the end pieces 155 and 156 so that the electromagnet 150, when in assembled relation, cannot accidentally be shifted axially of the tubular member 54 that supports the same. From Figure 2 it will be noted that the plungers 50 and 100 extend outwardly of the electromagnet 150 at opposite ends of the latter, and since the latter is of the ironclad type, the magnetic flux is practically entirely contained within the end pieces 155 and 156 and the enclosing ring 160, these parts being made of magnetic material, and the radially inner portions of the ends 155 and 156 approaching fairly close to the plungers 50 and 100 to reduce the gap through the non-magnetic member 54 at these points. According to the present invention, a conductor 170 leads from the junction 171 with the coil conductor 20 to the terminal 153 on the electromagnet 150, and a second conductor 172 leads from the other electromagnet terminal 154 to a point of connection 173 with the switch blade 26 and the conductor 27 that leads to the generator 8.

The operation of the device described above is substantially as follows. When the engine is not running and all parts are at rest, the positions of the several parts of the combined filter and lubricant device are as shown in Figure 2. The check valve plunger 50 will be held by gravity against the seat 48, but with the upper portion thereof within the electromagnet 150. The spring 102 serves to hold the upper valve plunger 100 in its upper position with the flange 101 against the lower end of the neck 96 and the lower portion of the member 125. In this position of the plunger 100, the ports 118 are in communication with the chamber 65, and the latter communicates with the unfiltered side of the filter through the passage 92 between the cup member 71 and the walls of the filter casing 60. The upper transverse ducts 119 are disposed above the ports 128 and are closed off by the disposition of the ports 119 within the closed portion of the member 125.

With the ports 119 in the position shown in Figure 2, if there is any lubricant stored under pressure in the filter casing, it is maintained under that pressure not only because the ports 119 and 128 are out of registration, but principally because the check valve 50 is held against the seat 48. Reference was made above to the fact that gravity holds the plunger 50 on its seat 48. This action, however, is appreciably assisted by the fact that whatever pressure to which the lubricant within the casing 60 is subjected is imposed upon the valve 50, for, in the first place, the sliding fit of the plunger 100 and the member 125 permits some flow of lubricant therethrough in order that the parts can move freely, and in the second place, the lubricant on the unfiltered side of the element 70 in the unfiltered lubricant chamber 91 between the cup member 71 and the casing 60 is also subjected to the interior pressure in the filter casing 60 and is in open communication with the interior of the tubular member 54 through the notches 94, the chamber 65, the transverse bores 118, and the interior axial bore 117. Thus, the check valve 50 is held tightly against its seat 48 by the pressure of the lubricant in the casing 60, so as to retain the lubricant within the casing under pressure for long periods of time during which the motor may not be in operation. During such inactivity, whatever lubricant that, during normal operation, flowed through the fitting 38 and the duct 3 will drain away into the bottom of the crank case of the engine so that the duct 3 and the fitting 38 are, during non-operating, periods filled with air.

Having in mind that, according to the present invention, a quantity of lubricant is to be forced into the lubrication system of the engine to prime the pump 2 before the engine is cranked, the manner in which the solenoid is energized just as soon as the ignition switch is turned on will first be described.

Referring now to Figure 1, when it is desired to start the engine 1 the ignition switch 11 will be closed, and in all cases this will occur normally before the engine 1 is subjected to any cranking operation. However, as soon as the ignition switch 11 is closed, current flows from the battery 7 through the conductors 18 and 19, the switch 11, and the conductor 20 to the coil 12. Current will also flow through the conductor 170, terminal 153, electromagnet 150, conductor 172, and connection 173. At this point, the current can flow to ground either through the coil 23 or through the generator 8 and lead 16. In any event, as soon as the switch 11 is closed a current will thus flow from the battery 7 through the solenoid 150 to the ground before the engine 1 is cranked.

I have described above the manner in which the electromagnet 150 is energized as soon as the ignition switch 11 is closed. The control which the energized electromagnet 150 is enabled to exert on the combined filter and lubricating and priming unit will next be described.

Referring now to Figure 2, as soon as current flows through the coil 151 of the electromagnet 150, magnetic lines of flux are set up but, due to the ironclad type of construction employed, all of the flux lines are confined within the shell surrounding the coil 151 and the portions of the plungers 50 and 100 lying within the electromagnet. As a result of current flowing through the coil 151, both the plungers 50 and 100 tend to be drawn within the electromagnet with a force that depends upon the amount of current and also upon the gap between the adjacent ends of the plungers 50 and 100. The size of the electromagnet and other constants of the device are so chosen that when the spring holds the plunger 100 with its shoulder 101 up against the lower end of the member 125 and when the check valve plunger 50 is disposed on its seat 48, the amount of force that is exerted upon the plungers 50 and 100 exceeds the bias of the spring 102 but does not exceed the force that the lubricant under pressure exerts upon the check valve 50 plus the weight of the latter. As a result of this arrangement, just soon as current begins to flow through the coil 151 the plunger 100 is drawn downwardly against the action of the spring 102, but the lower plunger 50 remains in the position shown in Figure 2, closing the upper end of the tube 43 even though the pull of the electromagnet is exerted upon the check valve plunger 50. The upper valve plunger 100 moves downwardly against the action of the relatively light spring 102 until the shoulder 101 on the plunger 100 engages the shoulder 175 (Figure 4) at the lower end of the enlarged section 65 of the member 54. This engagement limits the downward movement of the plunger 100, but by this time the lower end of the plunger 100 approaches relatively closely to the upper end of the check valve plunger 50, thus materially increasing the flux density so that the electromagnet 150 now exerts a force on the check valve plunger 50 that is greater than the force it exerted at the beginning of the downward movement of the plunger 100. As mentioned above, at first this force is not sufficient to lift the valve 50 against the oil pressure thereon and the weight thereof, but when the plunger 100 moves down against the shoulder 175 to the position shown in Figure 4, the flux density has so increased that the electromagnet 150 can exert sufficient pull on the check valve plunger 50 to lift the same off its seat 48, drawing the upper end thereof into contact with the lower end of the plunger 100, the oil in the space within the tube 54 around the lower end of the plunger 100 adjacent the shoulder 64 flowing through the vents 116 into the bore 110. Brass pins 177 (Figure 4) or the like may be inserted into the face of one of the plungers so as to keep the ends out of actual contact so that they will not tend to stick together when the solenoid 150 is deenergized, as is conventional in electromagnetic equipment.

As soon as the check valve plunger 50 is raised slightly off its seat, the amount of movement at this time being substantially the same as the spacing between the adjacent ends of the plungers 50 and 100 shown in Figure 4, the pressure of the oil against the check valve 50 is released since the lubricant is free to escape through the opening 48 and the tube 43. Since the plungers 50 and 100 are held together by the magnetic flux and act as a solid plunger with both ends extending outwardly of the electromagnet 150, the spring 102, initially compressed by the downward movement of the plunger 100, is now free to exert a force against the magnetically interlocked plungers 50 and 100 so as to raise both of them upwardly to the position shown in Figure 5 until the shoulder 178 on the check valve plunger 50 comes up against the shoulder 64 on the interior of the tubular member 54. The two members 50 and 100 are magnetically interlocker by the magnetizing effect of the solenoid 150 which is still energized, and the two members are held together in the position shown in Figure 5, but the upward movement of the members 50 and 100 to the position shown in this figure is sufficient to raise the transverse ports 119 up into registration with the ports 128 that communicate with the filtered lubricant chamber 90 (Figure 2). As soon, then, as the two plungers acting together reach the position indicated in Figure 5, the oil stored under pressure in the casing 60, is now released and flows through the registering ports 128 and 119, the axial bore 117, the check valve bore 110, the two branches 111 and 112, and downwardly through the tube 43 to the fitting 38, and into the lubrication system at the bore 3 (Figure 2). This flow of lubricant primes the pump 2 and, moreover, lubricates the bearings 5 (Figure 1) and all parts receiving lubricant from the oil portions of the lubrication system that communicate with the bore 3. It will be remembered that this lubrication occurs just as soon as the ignition switch 11 is closed, entirely independently of whether or not the cranking or starting mechanism for the engine 1 has at this time been placed in operation. From Figure 5 it will also be noted that the upward movement of the plunger 100 is not sufficient to bring the lower transverse bores 118 above the shoulder 63 upon which the spring 102 seats, so that the bores 118, which are closed in the position of the parts shown in Figure 4, are still closed in the position of the parts shown in Figure 5.

An important feature of the present invention lies in the fact, now apparent, that in any manual starting arrangement, the operator has full control of the time between which the priming and auxiliary lubricant is directed into the lubrication system and the cranking of the engine 1. For example, the operator of the automobile can turn on the ignition switch 11 and then wait a few moments before engaging the usual starting or cranking mechanism of the engine. Even in so-called automatic starting, there is a time lag between the closing of the ignition circuit and the actual initiation of the cranking means, and in practically all cases this time is sufficient to energize the solenoid, shift the valve mechanism so as to direct the flow of lubricant from the storage chamber into the lubrication system to prime the pump and lubricate the bearings before the starting mechanism has come into operation and cranked the engine. Thus, according to the present invention, before any of the motor parts begin to move, the oil pump has been primed and the bearing surfaces adequately lubricated, in preparation for the subsequent cranking and running of the engine.

As soon as the engine begins to run, it is essential to deenergize the electromagnet 150 in order to release the check valve plunger 50 from its upper position (Figure 5) and permit the same to close against the valve seat 48, except when lifted therefrom by the pressure of the lubricant from the oil pump 2, and retain the lubricant that is directed into the storage casing 60, and also in order to restore the valve mechanism to the position shown in Figure 2 closing the ports 128, so that lubricant flowing upwardly through the tube 43 by virtue of the operation of the oil pump 2 will be forced to pass through the lower portion of the bore 117, the transverse bores 118, the chamber 65, and between the walls of the cup member 71 and the casing 60 into the unfiltered side 91 of the casing. The manner in which the solenoid or electromagnet 150 is deenergized as soon as the engine begins to run will now be described.

Referring again to Figure 1, when the engine begins to run, the generator 8 is, of course, rotated and soon develops sufficient electromotive force to energize the cutout coil 23 and to close the switch 26 by bringing the same into engagement with the contact 30. As soon as this takes place, the terminals 153 and 154 of the electromagnet 150 are brought to the same polarity, since the generator voltage at the point 173 is impressed on terminal 154 through the conductor 172, and the other terminal 153 is subjected to the same voltage through the switch 26, conductor 31, coil 22, conductors 21 and 19, switch 11, and conductors 20 and 170. The small difference occasioned by the cutout coil 22 in the last mentioned line of connections is not sufficient to afford any substantial amount of energization in the solenoid 150, so that for all practical purposes, as soon as the engine begins to run, the electromagnet 150 is deenergized.

Figure 5:
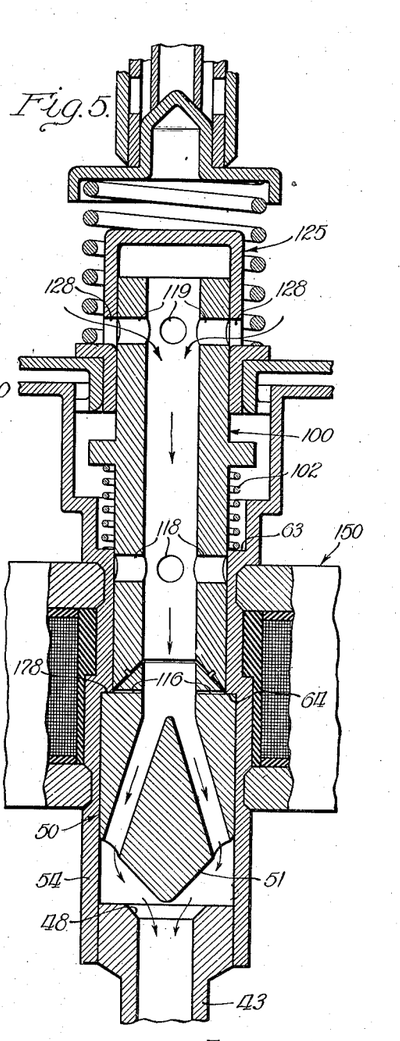
Figures 5, 6 and 7 show other positions of the controlling valve parts under various conditions of operation.
Figure 6:
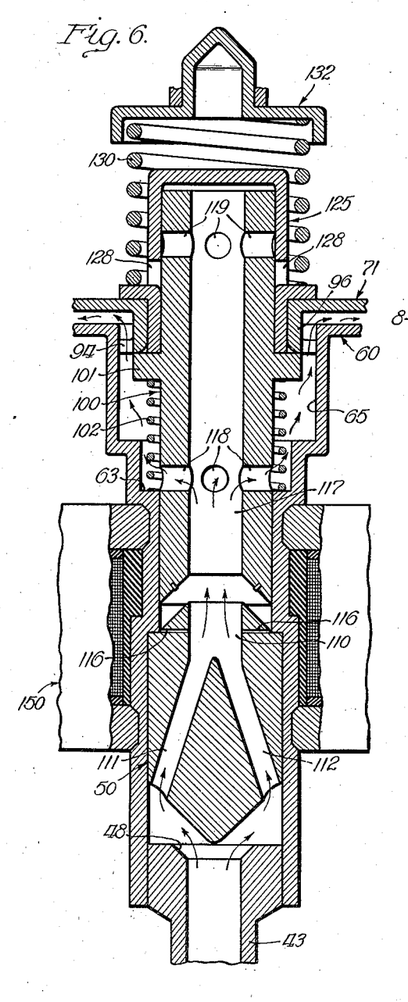

Referring now to Figure 5, which illustrates the parts in the positions they occupy after the ignition switch 11 has been turned on but before the electromagnet 150 has been deenergized, the instant the latter is deenergized, the attraction between the plungers 50 and 100 no longer exists and the lower plunger 50 moves toward the valve seat 48 and the spring 102 acts to lift the plunger 100 from the position shown in Figure 5 to the position shown in Figure 6 with the radial shoulder 101 up against the lower portion of the neck 96 and the member 125. This closes off communication between the upper transverse ducts 119 and the ports 128, thus closing off communication between the filtered lubricant chamber 90 and the axial bore 117 in the plunger 100. At the same time, the final upward movement of the plunger 100 brings the lower transverse bores 118 above the shoulder 63, thereby placing the bore 117 and tube 43 into communication with the unfiltered lubricant chamber 91 through the notches 94. When the engine begins to run, the oil pump 2 is, of course, placed in operation, having been initially primed before the engine 1 was cranked, and the pressure of the lubricant, due to the operation of the pump 2, causes lubricant from the pump 2 to flow out of the lubrication system duct 3 through the fitting 38 and up the tube 43, raising the plunger 50, which now serves as a check valve, off its seat 48. This lubricant flows up through the bore 117 and the transverse ducts 118 into the chamber 65, and from there the lubricant flows through the notches 94 and up between the walls of the cup member 71 and the casing 60 into the unfiltered lubricant chamber 91, from which the lubricant passes thru the filter element 70 into the filtered lubricant chamber 90, slowly raising the level of liquid therein and, at the same time, compressing the air above the liquid level. The vertical positon to which the float 140 is adjusted on the tube 141 serves to determine the amount of air or liquid level normally in the container 60. This air serves as a resilient cushion, retaining the pressure in the casing 60, and is replenished each time the engine is stopped and started, by the fact that the air that was trapped in the fitting 38 above the lower end 44 of the tube 43 by the previous discharge of lubricant by the primer is forced upwardly through the hole 46 by or is mingled with the upward surge of lubricant from the ducts 3 and 40 when the oil pump of the engine begins to operate. By virtue of this construction, therefore, sufficient air is injected into the casing 60 to replenish any air that is absorbed or carried away when the combined pressure and priming unit is operated for delivering its charge of lubricant under pressure into the lubrication system to prime the pump and lubricate the parts before the engine is cranked.

As the engine continues to run and the oil pump 2 forces more oil into the casing 60, the level therein slowly rises, carrying with it the float 140. It will be remembered that the member 75 is preferably an integrally formed part, so that there is no chance for any leakage of the air from above the oil level in the casing 60. When the oil level reaches a predetermined point, the sleeve 141, to the upper end of which the float 140 is attached, is lifted and exposes the ports 142 in the lower end of the tubular depending extension 77 that is formed integral with the member 75 and extends downwardly from the top 76 thereof. The oil under pressure is thus admitted through the ports 142 into the space, defined by the protuberances 137, between the valve tube 135 and the fixed tube 77. This pressure is then exerted upon the diaphragm 88 to which the upper end of the valve tube 135 is securely fastened as by a weld or fusion connection at 136.

The valve-controlling diaphragm 88 is normally bowed downwardly and requires considerable pressure to be exerted against it before the diaphragm will be deflected upwardly. In one embodiment of my invention, the diaphragm 88 is arranged to hold the valve tube 135 downwardly against the conical valve 134 (Figure 2) with a pressure equal to about thirty pounds per square inch. However, as soon as the pressure has been built up within the filter casing 60 to a point exceeding this value, the diaphragm 88 yields and is snapped upwardly to the position shown in Figure 3. The diaphragm 88 has the characteristic that once the aforesaid value of thirty pounds per square inch has been exceeded and the diaphragm starts to yield upwardly, it no longer exerts a resistance equal to thirty pounds per square inch, but exerts a reduced force, whereby the aforesaid snap action is secured. When the diaphragm 88 moves upwardly, it carries with it the valve tube 135, lifting the lower end thereof away from the conical valve member 134 (Figure 3), thus permitting the lubricant within the filtered lubricant chamber 90 to pass through the ports 142 and up through the tube 135 and out of the filter casing through the connection 85 back to the crank case (Figure 1). The diaphragm 88 does not move downwardly when the pressure against it diminishes only slightly below the aforesaid value of thirty pounds per square inch, but as the level of the liquid falls in the container 60 as a result of the opening of the ports 142 and valve 134, the float 140 and the exterior sleeve 141 move downwardly, closing the ports 142 and permitting no more liquid to flow out of the casing 60. The liquid within the tube 135 and underneath the diaphragm 88 continues to be forced outwardly since the diaphragm 88 is so arranged as to tend to move downwardly even when in its uppermost position shown in Figure 3. The tendency for the diaphragm, however, to move downwardly, is only comparable to a pressure of approximately five pounds per square inch, but this is sufficient to force the oil out of the tube 135 into the crank case of the motor and to move into its position in which it exerts a downward force approximately equivalent to thirty pounds per square inch, thus securely holding the valve tube 135 down against the valve closure 134. During this time, however, the pressure within the casing 60 may again be increased to the gradually rising level of oil therein, and when this pressure is again equal to substantially thirty pounds per square inch and has reached a given level, the float 140 again rises and the diaphragm 88 opens the valve at 134 to vent the lubricant casing 60 and to permit a quantity of lubricant to flow therefrom back through the crank case of the engine 1. By this means, therefore, during the normal operation of the engine 1, the casing 60 is maintained at practically all times with a substantial quantity of lubricant therein under a pressure of approximately thirty pounds per square inch, and any excess lubricant which would tend to make this pressure rise, is vented back to the crank case. The diaphragm 88 and associated parts, therefore, serve as a spring biased valve relief for the conventional lubrication system of the engine, maintaining a pressure equal approximately to thirty pounds per square inch throughout the system. It will be understood, of course, that the aforesaid values of five pounds and thirty pounds per square inch are only exemplary of any values which it may be desired to select. It is important, however, to arrange the relief valve mechanism so that the same is held closed with a positive pressure, preventing any small leaks or trickling of lubricant from the pressure chamber until the desired pressure therein has been attained, and then it is further important to have the relief valve mechanism arranged to open positively and without delay, preferably against a force that reduces, instead of increasing, so that a positive action of the valve mechanism is obtained, both in its opening and in its closing movements.

Figure 7:
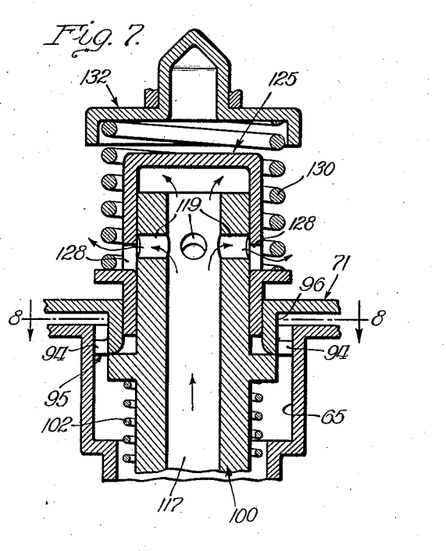
Figure 8:
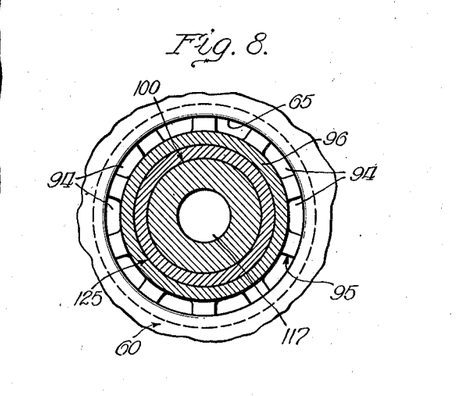
Figure 8 is a section taken along the line 8—8 of Figure 7.

It may occur that after a long period of use, or for other reasons, the filter element 70 may become clogged. In that event, there may be such a difference in pressure between the filtered lubricant chamber 90 and the unfiltered lubricant chamber 91 that the pressure of the incoming lubricant, that normally passes out through the transverse ducts 118 into the unfiltered lubricant chamber 91, may rise to a value sufficiently greater than the reduced pressure within the filtered lubricant chamber 90 that the bias of the spring 130, holding the member 125 down in the position shown in Figure 6, is overcome. If this does occur, the reduced pressure on the upper side of the member 125 and the increased pressure on the under side of said member will exceed the pressure of the spring 130, permitting the member 125 to move upwardly and bring the ports 128 into register with the transverse ducts 119, as best shown in Figure 7. Unfiltered lubricant coming directly from the bore 117 in the plunger 100 then passes directly into the filtered lubricant chamber 90, and eventually back to the crank case by virtue of the operation of the valve controlling diaphragm 88 as set forth above. Thus, my invention prevents a clogged filter from interfering with the storage of the desired amount of lubricant, even though it is unfiltered to some extent, in the filter casing 60. Also, my invention makes it impossible for a clogged filter to interfere with the lubrication of the engine by preventing an abnormal rise of pressure within the lubrication system.

Figure 9:
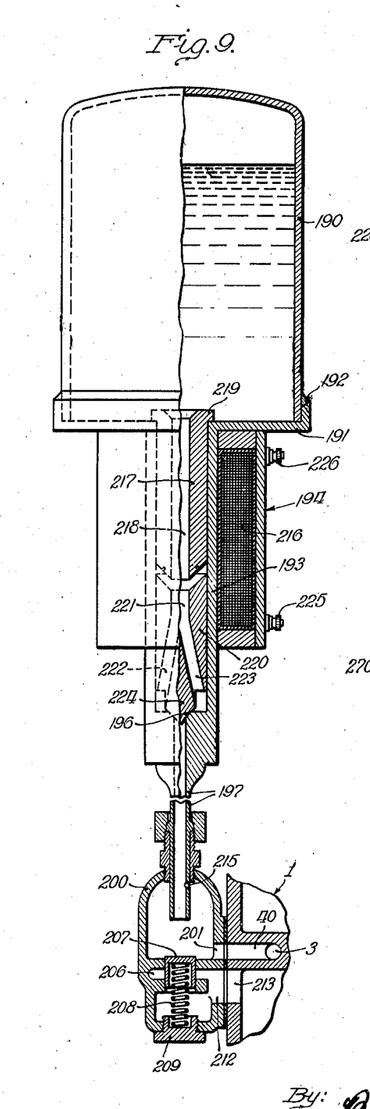
Figure 9 is a modification of the present invention, involving certain simplification, and illustrates an auxiliary lubricant unit that is not equipped with filtering means.

Figure 9 illustrates a simplified form of the present invention in which the functions of the filter have been eliminated and the unit utilized as an auxiliary means for priming the oil pump and lubricating the engine before the latter has been cranked. The pressure chamber of this unit is indicated at 190 and comprises a seamless casing formed of any suitable material and provided with a lower closure 191 welded thereto as at 192. Formed integral with the lower part 191 is a tubular extension 193 of non-magnetic material, such as brass, around which an electromagnet 194 is disposed. The lower end of the non-magnetic tubular extension 193 is formed with a valve seat 196 and terminates in a tubular part 197 that is connected into the lubrication system of the engine in any suitable manner. Preferably, however, the connection is established through an oil regulator unit 200 which is fastened to the side of the engine 1 and, like the unit 38 described above, is provided with a hole 201 communicating with the duct 40 leading to the lubricant bore 3. The oil regulator unit 200 is, in addition to the structure shown in Figure 2, provided with a lower chamber 206 which carries a movable plunger 207 against which a spring 208 bears. The spring is seated in a plug 209, and this portion of the regulator 200 is provided with a lateral opening 212 registering with an opening 213 formed in the crank case of the engine 1. In this form, when the oil pump 2 operates to develop excessive oil pressure within the lubricating ducts and bores, the plunger 207 is moved downwardly by the excessive oil pressure against the action of the spring 208, opening the interior of the fitting 200 into communication with the crank case, thereby venting the excess oil. The tube 197 is connected into the regulator fitting 200 in substantially the same manner as the tube 43 is connected in Figure 2, so that a further description of the these parts is not necessary. It is to be noted, however, that the lower end of the tube 197 is formed with an air opening 215 for the purpose of replenishing air that may be removed from the lubricant chamber for any reason.

The solenoid or electromagnet 194 includes a coil 216 which, as mentioned above, surrounds the non-magnetic tube 193. A sleeve 217 of magnetic material is disposed within the tube 193 and has an axial opening 218 extending from one end to the other of the sleeve 217, and the latter has a head or flange 219 by which the member 217 is held against movement relative to the solenoid 194, and, therefore, constitutes a stop for cooperation with an axially bored plunger 220 which is formed of magnetic material and has an axial duct 221 which, at the lower end, branches out into two sections 222 and 223, being of substantially the same form as the plunger 50 described above. The plunger 220 includes a section 224 that serves as a check valve for the upper end, as at 196, of the lubricant tube 197. The solenoid 194 is provided with terminals 225 and 226 which are adapted to be connected into the electrical system of the engine, shown in Figure 1, in the same manner as the solenoid 150 described above.

The operation of the device shown in Figure 9 is substantially the same as the device described above in connection with Figure 2 except, of course, the device of Figure 9 does not filter the lubricant, nor does it serve as a regulating means for determining the pressure within the lubrication system. When the ignition switch is closed, the solenoid 194 is energized and the plunger 220 is lifted off its seat 196, which permits the lubricant within the air tight lubricant storage chamber 190 to be discharged out through the tube 197 and into the lubrication system 3 of the engine to prime the oil pump 2 and to lubricate the bearings of the engine prior to the cranking of the latter. When the engine begins to run and the pump begins to operate, the pumped lubricant is forced back up through the tube 197, raising the plunger 220, which thus acts as a check valve, and forces lubricant into the chamber 190 until the pressure of the confined air at the top thereof, together with the head of liquid in the unit, is equal to the pressure established by the regulator 200. In the unit shown in Figure 9, the air at the top of the container 190 is periodically renewed by the fact that when the engine stops all of the lubricant in the lubrication system, including the conduit 3 and the dome of the regulator 200, drains to the bottom of the crank case of the engine and is replaced by air. Then when the pump again operates and forces lubricant up into these parts, the air that is trapped in the regulator 200 is forced up through the tube 197 through the opening 215 and into the pressure chamber 190. As mentioned above, the latter is in the form of a seamless container permanently and securely welded at 192 to the closure or base 191. Hence there is no likelihood of any leakage of air from the chamber, and lubricant can be stored therein under pressure and retained under that pressure for long periods of time, the only opportunity for leakage being at the check valve plunger 220, and it is a relatively simple matter to have this lubricant surrounded part leak-tight.

Referring again for the moment to Figure 2, it will be observed that when the solenoid 150 is energized to pull the plunger 100 down against the action of the spring 102, the fact that the member 100 is surrounded by oil under pressure does not restrict the downward movement thereof, for the diameter of the member at the lower end thereof is the same as the diameter at the upper end thereof, so that there is no displacement of oil as the plunger moves downwardly except from the lower end to the upper end. Thus, there is no appreciable resistance to the downward movement of the plunger 100, except that offered by the bias of the spring 102, until the shoulder 101 reaches the shoulder 175. In thus moving downwardly from the position shown in Figure 2 to the position shown in Figure 4, the plunger 100 not only closes off communication between the ports 118 and the unfiltered lubricant chamber 91 through the chamber 65, but also the ports 119 are moved to a position below and out of communication with the ports 123. This cuts off the check valve plunger 50 from the pressure of the lubricant, and since a liquid is practically incompressible, the check valve 50 is freed from the pressure of the lubricant stored in the chamber 60. Moreover, at this time the plungers 50 and 100 are quite close together so that a solenoid of relatively small capacity can readily exert sufficient force to raise the plunger 50 off its seat 48, especially since it does not have to act against the pressure in the chamber 60. However, in Figure 9, the solenoid 194 should be of somewhat greater capacity, since the solenoid 194 is required to exert the pull on the check valve plunger 220 required to lift the same off its seat 196 against the pressure of the oil stored in the container 190, with the plunger 220 separated a considerable distance from the end of the stop 217, sufficient to permit the plunger 220 to serve as a check valve with ample movement to permit the ready flow of oil from the tube 197 into the container 190. This increased gap at this point reduces the effective flux density, and hence the solenoid 194 should be larger than the solenoid 150 where the oil primer units are otherwise of similar capacity.

In any event, either the solenoid 150 or the solenoid 194, when arranged in the electrical system in the manner indicated in Figure 1, should have a resistance not less than the resistance of the ignition coil 12, so that there will be no likelihood of the generator 8 forcing current around through the conductor 172, the solenoid 150 or 194, and the conductor 170 to the ignition coil when the ignition switch 11 is opened. If the solenoid 150 or 194 offers too little resistance, there may be enough current flow through the path just indicated that opening the switch 11 would not stop the engine in case the latter is operating at such a speed that the generator 8 might develop sufficient voltage to cause the aforesaid by-passed flow of current to the ignition distributor and breaker with the switch 11 open. I have found that where the resistance of the solenoid is about the same as the resistance of the coil 12, opening the switch 11 under all conditions of operation will stop the engine.

Figure 10:
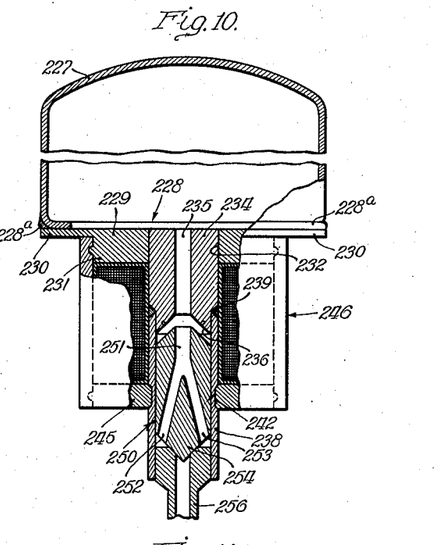
Figures 10 and 11 are other modified forms of controlling valve mechanism similar to the form shown in Figure 9.

In Figure 9, the base or closure 191 for the lubricant chamber 190 is formed integral with bined closure plate and solenoid end piece 220 is since the magnetic member 217 does not move within the solenoid 194, it is not essential that the portion of the tube in which the member 217 is disposed be of non-magnetic material; nor is it essential that the closure 191 be of non-magnetic material. In Figure 10, I have shown an arrangement in which only the portion of the tube in which the check valve plunger slides and the seat for the valve plunger are made of non-magnetic material. Referring now to Fig. 10, the seamless lubricant chamber 227 is formed with an inturned flange to the bottom of which a combined closure plate and solenoid end piece 228 is welded, as at 228a. The member 228 is of magnetic material and includes ring 229 which has a flange 230 welded at 228a and an end piece section 231 which has a central opening 232. A magnetic core piece 234 is securely fixed with an oil tight hydraulic press fit into the opening 232 so that the parts 229 and 234 are, for all practical purposes, integral. The member 234 is provided with an axial bore 235 communicating with the interior of the lubricant chamber 227 and terminates at its lower end in a conical opening 236.

A sleeve 238 of non-magnetic material is welded, as at 239, to the lower end of the core piece 234. The sleeve 238 is grooved, as at 242, to receive the lower end piece 245 of a solenoid 246, which may be of substantially the same form shown and described above in connection with Figure 2, except that the upper end section 231 and core or stop 234 are in firm oil-tight press fit engagement. The construction shown in Figure 10 has the advantage that more magnetic pull is gained by the elimination of one gap through the non-magnetic sleeve.

A check valve plunger 250 of magnetic material is mounted within the non-magnetic sleeve 238 for axial movement therein, and is provided with a central bore 251 in line with the bore 235 in the central member 234, the bore 251 dividing at the lower end of the member 250 into two branches, 252 and 253, with a section 254 therebetween serving as a conical check valve closure for the upper end of a lubricant tube 256. The latter is welded, brazed, or otherwise securely attached to the lower end of the non-magnetic sleeve 238. The tube 256 is connected into the lubrication system in any suitable manner, preferably in the manner shown in Figure 9.

The operation of the device shown in Figure 10 is substantially the same as that shown in Figure 9, so that a further description is believed to be unnecessary. However, it will be noted that the sleeve 238 and the upper end of the tube 256 are the only parts that need to be of non-magnetic material.

Figure 11:
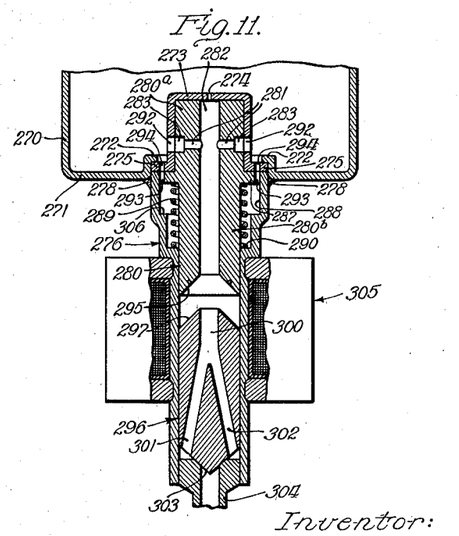

As will be apparent, both the forms of the invention shown in Figures 9 and 10 require that the solenoid develop sufficient energy to lift the check valve plunger against the pressure of the oil stored within the pressure chamber, whereas in Figure 2, the initial downward movement of the upper plunger, operating through valve ports and the like, closed off communication between the check valve plunger and the pressure within the storage chamber so that only a relatively small force is required to lift the check valve off its seat after the valve ports communicating with the storage chamber were closed. Figure 11 is a simplified form of the present invention embodying, however, the advantages just mentioned of cutting off the check valve from the pressure of the stored lubricant before opening the check valve in preparation for discharging the stored lubricant into the lubrication system to prime the pump and to secure initial lubrication of the bearings, and, in addition, other features described below.

Referring now to Figure 11, the lubricant storage chamber is indicated at 270, and includes a bottom section 271 having a central opening around which is disposed an axially and radially inwardly extending flange 272. A cup-shaped member 273 of non-magnetic material is disposed in this opening, and has a small vent 274 and a radially outwardly disposed flange 275 seated against the casing flange 272, being held in that position by a tube 276 of non-magnetic material with its upper end also extending partly into the opening in the casing 270 and securely soldered or otherwise firmly fixed in position, as indicated at 278. The non-magnetic sleeve or tubular member 276 receives an upper plunger member 280 of magnetic material which is similar to the plunger 100 described above in connection with Figure 2, except that the upper end 280a of the member 280 has a slightly greater diameter than the lower end 280b for a purpose which will be described below. The upper end 280a of the plunger 280 has one or more transverse bores 281 communicating at their inner ends with an axial bore 282 extending the length of the plunger 280, and the outer ends of the transverse bores 281 communicate with an annular groove 283 extending around the periphery of the plunger 280. In this connection, it will be apparent that the bores 281 may be formed like the bores 118 or 119, or that the two latter sets of bores may be formed like the bores 281 and annular groove 283, if desired. The plunger 280 is provided with a radial extension or shoulder 287 which is movable in an enlarged chamber or section 288 near the upper end of the non-magnetic tubular member 276. A spring 289 is seated with its lower end against the shoulder 290 in the lower portion of the chamber 288, and at its upper end the spring 289 acts against the radial shoulder 287 to hold the plunger 280 up in a position against the lower portion of the cup-shaped member 273 with the ports 281 and groove 283 registering with one or more ports 292 formed in the cup-shaped member 273 and communicating with the interior of the lubricant storage chamber 270. The flange 287 is provided with a plurality of vents 293 that are adapted to register with one or more similar vents 294 formed in the flange 275 of the cup member 273.

At the lower end of the plunger 280, the axial bore 282 terminates in a conical section 295, and slidable within the lower portion of the non-magnetic tubular member 276 is a check valve plunger 296 having a conical upper end 297 of complementary formation with respect to the end 295 of the upper plunger 280. The check valve plunger 296 is of substantially the same formation as the check plunger 250 shown in Figure 10, and is provided with a central bore 300 and branch ducts 301 and 302 disposed on opposite sides of the section 303 of the plunger 296 that constitutes the check valve proper. The check valve section 303 cooperates with the upper end of the lubricant tube 304 which may be connected into the lubrication system in the same manner indicated in Figure 9. The non-magnetic tubular member 276 is surrounded by a solenoid or electromagnet 305 of substantially the same construction as that shown in Figures 2 and 10.

The operation of the unit shown in Figure 11 is substantially as follows.

When the engine is not running and lubricant is stored under pressure in the container 270, the positions of the parts are as indicated in Figure 11. The upper plunger 280 is held in its upper position by the spring 289, and the weight of the plunger 296 and the pressure of the lubricant communicated thereto through the ports 292, the groove 283, the ports 281, and the axial bore 282, hold the check valve plunger 296 down tightly against its seat at the upper end of the tube 304. When the ignition switch 11 is closed the solenoid 305 is energized and the upper plunger 280 moves downwardly, first closing the ports 292 and shutting off communication between the pressure chamber 270 and the check valve plunger 296. When the plunger 280 moves downwardly, the pressure of the lubricant against the plunger 296 is reduced since the downwardly moving lower end 280b of smaller diameter does not displace as much oil as the upper portion 280a of larger diameter. However, the small vent 274 allows some flow of oil and prevents the upper end of the plunger 280 from acting as a dashpot and retarding the response of the plunger. The speed of descent of the plunger 280 is dependent upon the magnetic pull of the solenoid and the size of the vent 274. When the plunger 280 reaches its lower position, with the flange 287 engaging the shoulder 308 on the inside of the tubular member 276, the pull of the solenoid 305 now lifts the check valve plunger 296 off its seat. Then the two plungers 280 and 296 move upwardly together under the influence of oil pressure against the plunger portion 280a of larger diameter communicated thereto through the vent openings 293 and 294, and also the spring 289 in the manner set forth above in connection with Figure 2, until the communication between the pressure chamber 270 and the axial duct 282 is reestablished by the groove 283 registering with the ports 292. At this time the surge of lubricant under pressure is then forced downwardly through the axial ducts 282 and 300, the branch ducts 301 and 302, and the tube 304 to the lubrication system of the engine, the check valve plunger 296 being held up against the lower end of the upper plunger 280 by virtue of the solenoid 305 remaining energized until the engine begins to run. When the solenoid 305 is deenergized, the parts return to the position shown in Figure 11, at which time oil under pressure is admitted to the tube 304 and fills the chamber 270 until a certain pressure is attained therein. The check valve plunger 296 then retains the lubricant under that pressure, as will be readily understood from the preceding description.

One of the advantages of the construction shown in Figure 11 is that, by virtue of the difference in diameter of the upper and lower portions of the plunger 280, when the solenoid 305 is energized and the plunger 280 begins to move and is drawn inwardly of the solenoid toward the check valve plunger, suction is created on the inside of both plungers, which, when combined with the magnetic pull, acts to open the check valve. Thereupon the fluid pressure acting upon the upper plunger 280, due to the aforesaid different outside diameters, acts to shift the magnetically interlocked plungers 280 and 296 so as to open the ports 281 and 292, thereby permitting the primer to discharge past the open check valve into the oil pump and lubrication system. In this construction, the principal purpose of the biasing spring 289 is to maintain the plunger 280 in its upper position when the unit is inactive.

Another advantage of the construction shown in Figure 11 is the ease of assembly. It will be noted that soldering the upper end of the tube 276 to the casing 270, as at 278, serves at the same time to secure all of the operating parts of the unit in position. Similarly, if it is desired to disassemble the parts, the soldered attachment may be heated to release the same and the parts readily removed from the casing 270. It will also be noted that Figure 11 represents a simplified form of construction in which the valve mechanism associated with the check plunger is so constructed and operated that the check valve is cut off from the pressure of the lubricant in the storage chamber, to which it is normally subjected, before an attempt is made to release the check valve to direct a flow of lubricant into the lubrication system of the engine.

Mention was made above of the fact that the resistance of the solenoid, when it is associated with the electrical system of the engine in the manner shown in Figure 1, should bear such relation to the resistance of the ignition coil 12 so that the opening of the ignition switch 11 will at all times stop the engine. In some cases it may not be desirable to have the solenoid, controlling the discharge of lubricant under pressure into the lubrication system of the engine, bear this relation, or any other particular relation, to the ignition system generally or to the ignition coil in particular. It is essential, however, to deenergize the solenoid controlling the discharge check valve or other means so that as soon as the engine begins to run and the oil pump begins to operate lubricant is returned to the storage chamber and maintained therein under the desired pressure.

Figure 12:
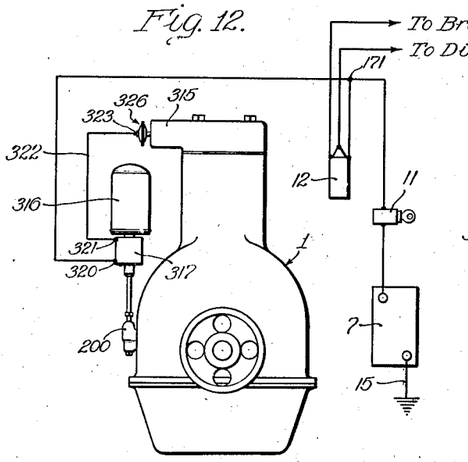
Figure 12 is a diagrammatic view, similar to Figure 1, illustrating the principles of the present invention as embodied in a unit in which a suction controlled grounding switch is incorporated.
Figure 13:
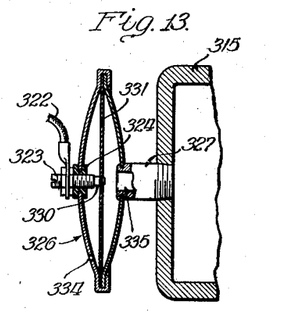
Figure 13 is an enlarged view of one form of suction controlled grounding switch.

Figures 12 and 13 show a suction operated grounding switch which is to be utilized in place of the conductor 172 and associated parts shown in Figure 1 in which the solenoid 150 in that figure is grounded through the generator 8 or the generator cutout 9. Referring now to Figures 12 and 13, the intake of the engine 1 is indicated by the reference numeral 315, and the pump priming and lubricant supply unit is indicated in its entirety by the reference numeral 316 and is controlled by a solenoid 317. The unit 316 may be like any of the units described above, but, for purposes of clarity, has been illustrated like the unit shown in Figure 10. One terminal 320 of the solenoid 317 is connected into the electrical system at the point 171 in practically the same manner as the terminal 153 of the solenoid 150 in Figure 1 is connected into the ignition system illustrated in that figure. The other terminal 321 of the solenoid 317 is connected by means of a conductor 322 to a post 323 (Figure 13) which is adjustably received in an insulating bushing 324 carried in electrically separated relation with respect to a metallic diaphragm casing 326 that is fastened by an apertured threaded bushing 327 that is screwed into the intake manifold 315 of the engine 1. The post 323 extends into the interior of the diaphragm casing 326 and is normally in engagement with a contact point 330 carried on a flexible diaphragm 331, the edges of which are firmly clamped and secured in place by the edges of the casing 326 which thus electrically grounds the diaphragm 331.

One side of the diaphragm is subjected to atmospheric pressure, as through a small opening 334, while the other side is subjected to the suction in the intake through the opening 335 extending through the bushing 327. When the engine is not running, the resilience of the diaphragm 331 holds the contact 330 in engagement with the post 323, and thereby grounds the terminal 321 of the solenoid 317. As soon as the ignition switch 11 is closed, the solenoid 317 is energized, and a quantity of lubricant from the unit 316 is discharged into the lubrication system of the engine 1, in a manner similar to that described above. When the engine fires and begins to run, suction is quickly built up in the intake manifold 315, and this draws the diaphragm 331 inwardly and moves the contact point 330 away from the post 323, thereby interrupting the circuit through the solenoid 317 and thus immediately deenergizing the latter. The diaphragm 331 is arranged so that, as long as the engine 1 is operating, the contact 330 is out of engagement with the post 323, but as soon as the engine stops and the pressure within the intake manifold 315 rises to substantially atmospheric pressure, the contact 330 engages the post 323 and establishes a ground for the solenoid 317, whereby, as soon as the switch is again closed, the device 316 will come into operation.

From the above description and the embodiments of the present invention illustrated in the accompanying drawings, it will be apparent that my invention contemplates a novel method of and a novel construction and arrangement of control for an apparatus for priming the oil pump, for supplying lubricant to the bearings and working parts, and filling the oil ducts of the lubrication system of a machine prior to starting thereof after a period of rest. It will also be apparent that the priming of the oil pump places it in a condition so that at low temperatures as well as high temperatures it will at once upon starting to rotate handle a sufficient quantity of lubricant, even though the latter may be congealed at low temperatures, to satisfactorily lubricate the engine, and that the filling of the oil ducts in the lubrication system thereof adequately lubricates all moving parts and bearings thereof prior to starting or cranking of the engine. Also, it will be apparent that this priming and lubrication, prior to starting and cranking of the engine, is capable of being controlled by means that utilizes the ignition switch of the engine ignition system. Also, if desired, a separate button or switch may be provided for actuating the primer valve for releasing lubricant from the storage chamber. By virtue of my invention, the storage and manipulation of the stored lubricant is controlled by a valve, and the latter is disposed in a container which has no operating parts extending therethrough, thereby rendering a device constructed according to the present invention wholly leak-tight, without employing bothersome packing glands and other expedients of like nature. Also, by my invention I am enabled to compensate for loss of air in the reserve chamber by connecting the latter to the air dome of the oil pressure regulator of the engine lubrication system.

In its broader aspects, certain features of my invention contemplate the provision of a magnetically controlled valve or other part, and particularly a magnetic check valve for the storage of lubricant under pressure which is so arranged as to function as a check valve only when the engine is running and can be operated manually only with the engine at rest, the operating coil for the magnetic check valve becoming inoperative when the generator voltage builds up or when the vacuum becomes effective in the intake manifold. It will also be apparent that, according to the present invention, the lubricant may be stored against a pressure other than a confined body of air; for example, the lubricant might be forced into a container having a spring biased movable wall, such as a piston, or some similar arrangement.

While I have shown and described above the preferred structures in which the principles of the present invention have been illustrated, it is to be understood that the features shown in only one embodiment of my invention may be incorporated in any of the other embodiments and that, in fact, widely different means may be employed in the practice of the broader aspects of my invention.

What I claim, therefore, and desire to secure by Letters Patent is:

1. In an internal combustion engine, the combination of a generator driven from the engine, a storage battery, connections between the battery and the generator arranged to prevent a flow of current from the battery to the generator when the latter is not operating and to provide for a flow of current from the generator to the battery, means adapted to supply lubricant to the engine when the latter is not running, and solenoid means for controlling said lubricant supply shunting at least a portion of said connections whereby the solenoid means can be energized by a flow of current from the battery through the solenoid means and said generator until the latter is driven by the operation of the engine at sufficient rate to bring both terminals of the solenoid means to substantially the same polarity.

2. In combination with a lubrication system for an internal combustion engine having means for cranking the same to start, a source of lubricant under pressure for directing lubricant into said system when the engine is not running, a valve biased to move into closed position and adapted to be opened to permit a flow of lubricant from said source into said lubricating system, electromagnetic means operable for opening said valve, and means responsive to the running of the engine for bringing opposite ends of said electromagnetic means to substantially the same polarity so that said biased valve may move into its closed position.

3. In combination with a lubricating system having a lubricant supply duct and a pressure regulator therefor having an air dome from which oil drains and is replaced by air when the system is not in operation, an auxiliary supply tank connected with said air dome to receive both air and lubricant from said lubricating system until the pressure in said auxiliary supply tank is substantially equal to the operating pressure in said lubricating system, a check valve for retaining lubricant under pressure in said auxiliary supply tank when the pressure in said lubricating system falls, means for opening said check valve to provide for a flow of lubricant from said auxiliary supply tank into said lubricant supply duct, and means for trapping air in said dome whereby the trapped air is forced into said tank when the operating pressure in the lubricating system is again built up.

4. An oil primer for an internal combustion engine lubricating system having a lubricant supply duct and a pressure regulator therefor provided with an air dome, comprising an auxiliary supply tank closed at its upper end, a conduit leading from the lower end of said auxiliary supply tank and extending into the upper portion of said air dome a predetermined amount, there being an air hole in the conduit in the air dome adjacent the upper portion thereof, check valve means serving to accommodate the flow of lubricant under pressure from said lubricating system into said auxiliary supply tank until the pressure of the confined air and lubricant thereing is substantially equal to the pressure within said lubricating system, said check valve serving to prevent flow of lubricant from said auxiliary supply tank, and means for unseating said valve means so as to provide for the flow of lubricant from said auxiliary supply tank into the lubricant supply ducts of said lubricating system when the engine is not running, the flow of lubricant from said auxiliary supply tank through said air dome serving to trap air in the upper portion thereof and the subsequent resumption of operation of the lubricating system serving to force lubricant from the lubricating system into said auxiliary supply tank and to force said entrapped air through said air vent and said conduit into said auxiliary supply tank so as to supply air thereto.

5. In a lubrication system, a filter having a pressure chamber adapted to contain lubricant under pressure and a filter element therein, a conduit adapted to conduct lubricant to and from said filter chamber and including valve means operable in one position to open the unfiltered side of said filter unit to said conduit to permit a flow of lubricant to the unfiltered side of the filter, and in another position to open the filtered side of said filter element to said conduit to permit a flow of lubricant from the clean side of the filter element through the conduit, and means for governing the position of said valve means.

6. In a lubrication system for the bearings of an internal combustion engine, the combination of a filter having a pressure chamber adapted to contain lubricant under pressure and a filter element therein, said engine having a lubricant pump for circulating lubricant under pressure, a passageway leading from said filter chamber to said pump and bearings, valve means arranged in one position to provide for a flow of lubricant through said passageway into the unfiltered side of said filter element and to prevent a flow of lubricant from the filtered side of said filter element into said passageway, said valve means being operative in another position to close communication between the unfiltered side of said filter element and said passageway and to open communication between said passageway and the filtered side of said element, whereby filtered lubricant under pressure in said chamber will be directed to the bearings of said engine, means for moving said valve means into said second position before the engine starts, and means responsive to the starting of the engine for shifting said valve means back into said first position so as to direct lubricant coming from said pump into the unfiltered side of said filter chamber.

7. A combined oil filter and primer for the lubrication system of an internal combustion engine, comprising a filter casing having a filter element therein, means for conducting lubricant into the filter casing under pressure from the lubrication system of said engine, a check valve adapted to prevent the retransfer of lubricant from the casing to said engine, a valved passage leading from the filter casing to the crank case of the engine for conducting filtered lubricant thereto, biased valve means serving to prevent a flow of lubricant through said valved passage until the pressure within said casing has reached a predetermined value, and float controlled means also serving to prevent a flow of lubricant through said valved passage until the lubricant level in said casing has reached a predetermined point, and means operative when the engine is not running for releasing said check valve so as to provide for a flow of lubricant under the influence of the pressure within said filter for lubricating said engine prior to the starting thereof.

8. A lubrication system for an internal combustion engine, comprising a pump, conduit means leading from said pump to the bearings of the engine for delivering lubricant thereto, a filter comprising a casing having a filter element dividing the casing into two chambers, one adapted to receive unfiltered lubricant from said first conduit and the other adapted to contain filtered lubricant passing through said filter element, a relief passage leading from the filtered lubricant chamber to the crank case of said engine, valve means governing said relief passage, a biased pressure responsive diaphragm, and means responsive to a predetermined amount of lubricant in said casing for placing said diaphragm into communication therewith, said diaphragm then acting to hold said valve closed so as to prevent the flow of lubricant from said second chamber until the pressure therein is sufficient to overcome the bias of said diaphragm, whereby said means serves to limit the pressure of the lubricant delivered to said bearings.

9. A lubrication system as defined in claim 8, further characterized by said biased pressure responsive diaphragm being constructed so that the bias exerted by the diaphragm when holding the valve closed is greater than the bias exerted by the diaphragm when the valve is in its open position.

10. A filter comprising a casing adapted to contain lubricant under pressure, a filter element therein dividing said casing into two chambers, one for unfiltered lubricant and the other for lubricant that has been filtered by having passed through said filter element, a conduit communicating with said casing and including passageways leading, respectively, to said chambers, separate valve means controlling said passageways, and means connecting said valve means for joint operation so that lubricant flowing to said casing to be stored under pressure therein is directed into said one chamber and lubricant flowing from said casing under said pressure is delivered to said conduit from said other chamber.

11. In a lubrication system, a filter having a filter element and adapted to contain lubricant under pressure on both sides of said element, a lubricant passage communicating with both sides of said filter element and having a valve seat therein, an ironclad solenoid surrounding said passage, a check valve of magnetic material adapted to be held to said seat by the pressure of said lubricant and arranged when in seated position to extend outside said solenoid, a plunger of magnetic material in said passage between said filter and said check valve and extending outside said solenoid opposite said check valve, spring means biasing said plunger for outward movement away from the solenoid, said plunger extending into said solenoid and adapted to be moved toward said magnetic check valve against said spring means when said solenoid is energized and said check valve held to its seat by said lubricant pressure, the closing of the gap between the adjacent ends of said plunger and valve serving to increase the magnetic flux so that said check valve is raised from its seat against the pressure of said lubricant, said spring means serving to move both said plunger and said valve away from said seat after said check valve has been released, and valve means controlled by the movement of said plunger for closing off communication between said passage and the space on one side of said filter element and opening communication between the other side of said filter element and said passage as said plunger and check valve move as a unit away from said valve seat.

12. In an internal combustion engine having a lubrication system, a battery and an ignition switch, the combination of a lubricant reservoir to receive lubricant under pressure when the engine is running, check valve means to hold said pressure, electromagnetic means for opening said valve during the time between the closing of the ignition switch and the running of the engine, said electromagnetic means having one end connected to receive current from the battery when said ignition switch is closed, and a circuit interrupting switch responsive to the engine connected with the other end of said electromagnetic means and arranged to be opened when the engine begins to run.

13. A combined oil filter and primer for the lubrication system of an internal combustion engine, comprising a filter casing having a filter element therein, means for conducting lubricant into the filter casing under pressure from the lubrication system of said engine, valve means adapted to prevent a flow of lubricant from said casing into the lubrication system of said engine, a valved passage leading from the filter casing to the crank case of the engine, a float controlled valve serving to prevent a flow of lubricant through said valved passage until the pressure and oil level within said casing has reached predetermined values, means for adjusting the position of said float so as to adjust said values, and means operative when the engine is not running for releasing said valve means so as to provide for a flow of lubricant into said lubrication system prior to the starting of the engine.

14. Lubricating means for an internal combustion engine or the like wherein lubricant is fed from a source under pressure, the combination of a conduit formed at least partially of non-magnetic material and adapted to receive lubricant from said source, a valve formed of magnetic material and disposed within the non-magnetic portion of said conduit for controlling the flow of lubricant therethrough, and an electromagnetic coil disposed exteriorly of the non-magnetic portion of said conduit and entirely out of contact with the lubricant flowing therethrough for controlling said valve, the lubricant entering said conduit at one end of said coil and leaving said conduit beyond the other end of said coil.

15. A lubricating system for an internal combustion engine or the like having a lubricant pump and parts to be lubricated comprising an auxiliary reservoir receiving lubricant from said pump when the engine is in operation, a conduit conducting lubricant to and from said reservoir, a check valve disposed in said conduit providing for a flow of lubricant into the reservoir and preventing lubricant from flowing out of the reservoir, means for temporarily closing off the portion of said conduit in which the check valve is disposed from communication with said reservoir, means for opening said check valve, and means for returning said first means to a position restoring communication between said portion of the conduit and said reservoir.

16. In an internal combustion engine, the combination of a generator driven from the engine, a storage battery adapted to be operatively connected with the generator, means maintaining a source of lubricant under static pressure, a magnetic valve controlling the flow of lubricant from said storing means, means establishing a current flow from the battery through said generator for controlling said valve means until the voltage developed by the generator in operation is substantially equal to the battery voltage, and means operative by the current generated by the generator for deenergizing said magnetic valve.

17. A filter for a lubricating system, comprising a chamber for lubricant under pressure, a filter element therein, conduit means leading from said lubricating system to the chamber on both sides of the filter element, valve means normally biased to direct all of the oil flow through said conduit means into said chamber on the unfiltered side of the filter element, and means for controlling said valve means so as to close communication between the conduit means and said unfiltered side of the filter element and open communication between the other side of the filter element and said conduit means so as to provide for a flow of lubricant from said other side of the filter element through said conduit means into said lubricating system.

18. A filter for a lubricating system as defined in claim 17, further characterized by said valve means acting as a check valve so as to maintain the lubricant under pressure in said chamber until communication is established between said other side of the filter element and said conduit means.

19. In a lubrication system, the combination of a source of lubricant under pressure, a lubricant discharge passage, an iron-clad solenoid surrounding said passage, a valve seat in said passage, a check valve of magnetic material in said passage adapted to be held to said seat by the pressure of said lubricant and arranged when in seated position to extend outside said solenoid, a plunger of magnetic material in said passage and spring means biasing said plunger for outward movement, said plunger extending into said solenoid and adapted to be moved toward said magnetic check valve when said solenoid is energized, the closing of the gap between the adjacent ends of said plunger and valve serving to increase the magnetic flux so that said check valve is raised from its seat against the pressure of said lubricant, said spring means serving to move both said plunger and said valve away from said seat after said valve has been released from its seat.

20. In a lubrication system, the combination of a source of lubricant under pressure, a lubricant discharge passage, a check valve biased to maintain said passage closed, a plunger electromagnet surrounding said passage, a movable plunger disposed within said passage and connected to said check valve, a stop for the plunger disposed within said passage and arranged so that the magnetic gap between said plunger and said stop is small when said check valve is at the point of being opened by the movement of the plunger, and means operative after said plunger has opened the check valve for opening the latter an additional amount to provide for free flow of lubricant from said source through said passage.

21. The combination set forth in claim 20, further characterized by said plunger and stop disposed in said passage having bores extending generally axially therethrough to provide for a flow of lubricant from the source through said passage.

22. A lubricating system for an internal combustion engine or the like having an electrical system that includes a generator driven from the engine, a battery, an ignition coil and an ignition switch controlling the flow of current from the generator or battery to said coil, said lubricating system comprising a source of lubricant, electromagnetic means for controlling the flow of lubricant from said source to said engine, a conductor leading from one side of said electromagnetic means to the generator, and a second conductor leading from the other side of said electromagnetic means to the switch side of said coil, said electromagnetic means having a resistance at least approximately equal to the resistance of said coil, whereby when said switch is open, the ignition system is inoperative, notwithstanding a connection from the generator thereto through said electromagnetic means.

23. A lubricating system for an internal combustion engine or the like having an electrical system that includes a generator driven from the engine, a battery, an ignition coil and an ignition switch controlling the flow of current from the generator or battery to said coil, said lubricating system comprising a source of lubricant, a conduit adapted to receive lubricant from said source, a valve for controlling the flow of lubricant through said conduit, electromagnetic means out of contact with said lubricant having a reciprocable plunger, means connecting the latter directly with said valve for controlling the latter, and connections whereby said electromagnetic means is energized when said ignition switch is turned on to energize said ignition coil.

24. In lubrication apparatus for an internal combustion engine which has a pressure lubricating system and also an electrical system of the type including a battery and an engine driven generator for charging the battery, the combination of means for storing a portion of the lubricant, and electromagnetic means operating independently of rotation of said generator to release and direct said lubricant to the engine in response to a flow of current from said battery through said electromagnetic means and generator, prior to rotation of the latter by the motion of the engine.

25. In lubrication apparatus for an internal combustion engine which has a lubricating system and also an electrical system including a battery and an engine driven generator for charging the battery, the combination of means for storing a quantity of lubricant, electromagnetic means for releasing said stored lubricant for flow to a part of the engine, and means for terminating said release of the stored lubricant in response to normal generator action when the engine begins to run.

26. Lubricating means for an internal combustion engine or the like wherein the lubricant is fed from a pressure source, the combination of a conduit formed at least partially of non-magnetic material and through which the lubricant is adapted to flow, a valve port in said conduit, a reciprocable valve adapted to control said port, said valve comprising a magnetic portion reciprocating within the non-magnetic portion of said conduit, an electromagnetic coil disposed exteriorly of said conduit and creating a magnetic flux passing therethrough and acting on the magnetic portion of said valve to shift the latter, and a duct formed within the magnetic portion of said valve and through which the lubricant is adapted to flow in passing through said conduit and valve port.

27. In lubrication apparatus for an internal combustion engine which has a pump actuated lubricating system and also an electrical system including a battery and an engine driven generator for charging the battery, the combination of means for storing a quantity of lubricant, electromagnetic means responsive to current from said battery for releasing said stored lubricant for flow to parts of the engine while said engine is at rest, said electromagnetic means being operative to release said stored lubricant independently of the starting time of said engine, and means for terminating the release of the stored lubricant in response to normal generator action when the engine begins to run.

28. An oil primer for an internal combustion engine lubricating system comprising a supply tank, a check valve, a supply duct, an air dome disposed in said supply duct, means for retaining air in said air dome when said supply duct is voided and again filled with lubricant, and means for conducting said retained air to said supply tank when the lubricant opens said check valve.

29. A combined oil filter and primer for the lubricating system of an internal combustion engine comprising a casing having a filter element therein dividing the casing into two chambers, one for unfiltered lubricant and the other for filtered lubricant, means for conducting lubricant under pressure from the lubricating system of said engine into the unfiltered lubricant chamber of said casing, means for discharging lubricant from the filtered lubricant chamber of said casing to the lubricating system of said engine prior to the starting of the latter, biased valve means for discharging lubricant from said filtered lubricant chamber while said engine is running and the lubricant pressure has reached a predetermined value, and means responsive to pressure of said lubricant for operating said biased valve means.

30. In lubricating apparatus for an internal combustion engine having an electric generator driven thereby, the combination of an oil primer comprising a source of lubricant, electrically energized means for operating said primer, and means utilizing said generator as part of the electrical circuit for energizing said electrically energized means when said generator is not rotating, whereby to cause said primer to produce a priming flow of lubricant to the engine before the latter starts operating.

31. In lubricating apparatus for an internal combustion engine having an electrical system including a battery and a generator driven by the engine for charging the battery, the combination of an oil primer for said engine, electrically energized means for operating said primer, and means connected with said electrically energized means and utilizing the potential of said generator as a bias on the potential of said battery when said generator is rotating, whereby to terminate operation of said primer.

32. An oil primer for an internal combustion engine lubricating system comprising a supply tank, a supply duct connecting said tank with said system, a check valve controlling flow through said supply duct from said supply tank to said system and adapted to be opened by lubricant, an air dome disposed in said supply duct, means for causing said air dome to retain air when said supply duct is voided and again filled with lubricant, and means for causing said retained air to be conducted to said supply tank when the lubricant opens said check valve.

WALDEMAR E. PAULSEN.